United States Patent [19]

Gilb et al.

[11] 4,410,294

[45] Oct. 18, 1983

[54] VARIABLE PITCH CONNECTOR

[75] Inventors: Tyrell T. Gilb, Berkeley; Alfred D. Commins, Livermore, both of Calif.

[73] Assignee: Simpson Strong-Tie Company, Inc., San Leandro, Calif.

[21] Appl. No.: 261,680

[22] Filed: May 7, 1981

[51] Int. Cl.³ .................... B25G 3/00; E02D 27/00
[52] U.S. Cl. .................................. 403/27; 403/403; 403/232.1; 52/90
[58] Field of Search ............... 403/232.1, 389, 3, 4, 403/399, 400, 403, 27; 52/90, 714

[56] References Cited

U.S. PATENT DOCUMENTS

| | | |
|---|---|---|
| 1,652,612 | 12/1927 | Daniels . |
| 2,354,801 | 8/1944 | DeHuff ........................ 403/389 |
| 2,477,163 | 7/1949 | Barnett . |
| 3,031,727 | 5/1962 | Nesbitt . |
| 3,184,800 | 5/1965 | Nelson . |
| 3,333,875 | 8/1967 | Tracy . |
| 3,423,898 | 1/1969 | Tracy et al. . |
| 3,727,358 | 4/1973 | Howell ........................... 52/712 X |
| 3,749,428 | 7/1973 | Hustead . |
| 3,967,908 | 7/1976 | Snow et al. . |
| 4,015,399 | 4/1977 | Prins . |

OTHER PUBLICATIONS

Simpson Company 1981 Catalog, p. 26.

Primary Examiner—Andrew V. Kundrat
Attorney, Agent, or Firm—James R. Cypher

[57] ABSTRACT

A variable pitch connector for attaching an inclined beam member to a bearing member. The connector is constructed to selectively support beams at different slopes. The connector is formed from a single sheet metal member consisting of three parts: a base which is attached to the bearing plate, an inclined seat member with side members adapted for attachment to the inclined beams and an upright member which is attached to the side of the bearing member. Adjustability is accomplished by varying the angle of the two bend lines attaching the three parts together.

7 Claims, 9 Drawing Figures

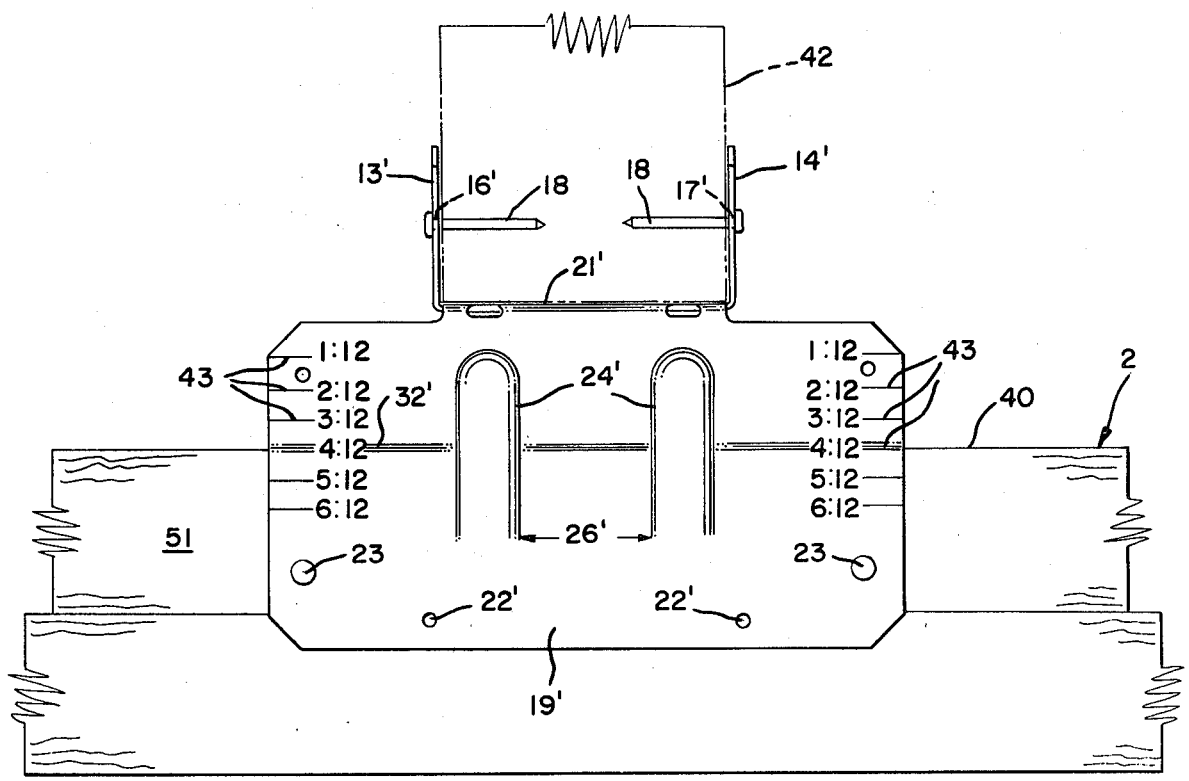
FIG. 7
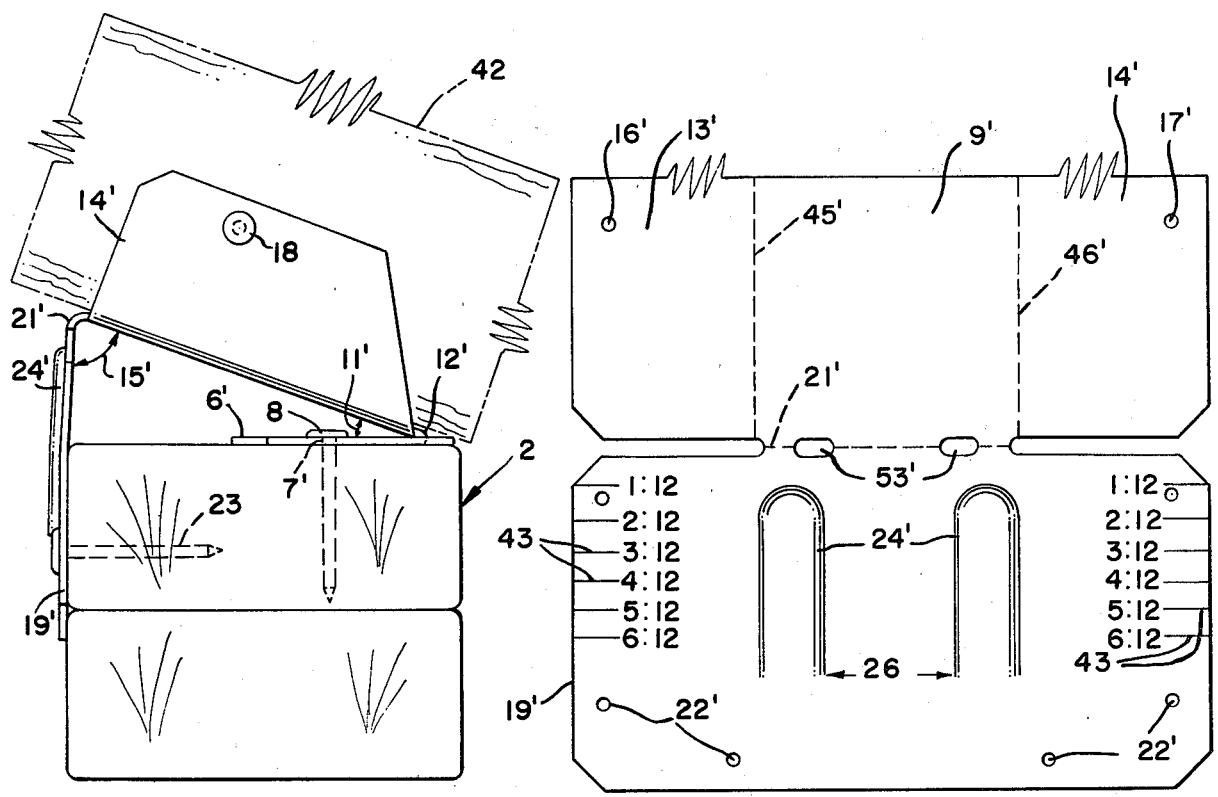
FIG. 8
FIG. 9

VARIABLE PITCH CONNECTOR

BACKGROUND OF THE INVENTION

Standard building practice in wood frame construction calls for the common rafter to be joined to the double top plate by notching the rafter according to the pitch of the roof and toe nailing the rafter to the top plate. Obviously, notching the rafter weakens it considerably and toe nailing is only as effective as the skill of the carpenter. If the rafter is made of metal or has an I shape or made from Micro-Lam lumber as by Trus Joist Corporation of Boise, Idaho, then the standard notching method cannot be used and some type of metal connector is required or the top plate must be formed with a plurality of beam raps or the entire top plate must be beveled to the same angle as the roof pitch.

Daniels, U.S. Pat. No. 1,657,243 teachs a metallic casting for joining a timber to a top plate. The device is not adjustable in the field for accommodating different roof pitches. The device has no positive restriction to prevent overturning nor is there any attachment to the upper side of the plate to prevent lateral movement. A different bracket would have to be cast at the factory for each different roof pitch.

Barnett, U.S. Pat. No. 2,477,163 discloses a method of attaching the top and bottom chords of a truss. The top chord must be cut at an angle. This device does not attach the truss to the top plate.

Nesbitt, U.S. Pat. No. 3,031,727 attaches the top and bottom chords of a truss together and to a support post but has no adjustment means for attaching top chords with different pitches.

Nelson, U.S. Pat. No. 3,184,800 is the first support used with common rafters known to applicant. This support is not acceptable by any building code since there is no seat support. All of the load is carried on the outer edge of the plate and across an edge line of the rafter. There is no uplift value as required in areas subject to hurricanes or high uplift winds. Finally, there is no control of the angle; either in the installation or after installation. The rafter is free to rotate.

Tracy, U.S. Pat. No. 3,333,875 shows a bracket in FIG. 2, but it is not clear how the device is constructed. Apparently, it is a welded bracket which would be too expensive for construction purposes. The device obviously cannot be adjusted for pitch and there does not appear to be any attachment to the side of the plate for uplift value.

Tracy, U.S. Pat. No. 3,423,898 teaches the use of a simple U-bracket. There is no seat; all the bearing being taken by the edge nails. This device would take a great many nails and be far too heavy for practical application. Such a device could not be used for installing Trus Joist Micro-Lam's.

Hustead, U.S. Pat. No. 3,749,428 illustrates the pin type of connector which is too expensive for common rafters and unusable for Trus Joist Micro-Lam beams.

Snow, U.S. Pat. No. 3,967,908 discloses a two piece bracket which still requires end cutting of the rafter since it provides no end bearing. Only the nails provide bearing support.

Prins, U.S. Pat. No. 4,015,399 illustrates an apparatus for securing a hat shaped roof member using a threaded bolt and a complicated bracket. Such a device is far too expensive except for a very special building type structure.

There are presently anchors available from connector manufacturers but they are limited to 2×6 and 2×8 members and are unsuitable for members such as the Micro-Lam made by Trus Joist. See Simpson Company 1981 Catalog, Page (26).

SUMMARY OF THE INVENTION

The present connector may be used to connect "I" type Micro-Lam beams by Trus Joist Corporation to the top of a wall or plate without having to provide a tapered chamfer strip of the appropriate angle on top of the plate or alternately to provide specially notched plates.

The same conductor can be used to connect the common rafter to a top plate without having to notch the rafter.

The connector is capable of being bent in the field to accommodate rafters installed at one of several possible pitches.

The connector not only provides bearing but also provides restraint against uplift forces.

When properly marked, the connector can be used as a guide to provide the proper slope to the connector so that there is no guessing as to the proper placement of the connector.

The connector provides all of the features above and yet is inherently low cost in nature thereby making it commercially feasible.

BRIEF DESCRIPTION OF THE DRAWINGS:

FIG. 7 is a front view of an alternate form of the invention.

FIG. 8 is a side view of the connector shown in FIG. 7.

FIG. 9 is a top plan view of a portion of the alternate connector shown in FIG. 7 prior to bending.

DESCRIPTION OF THE PREFERRED EMBODIMENTS

Figure 1:
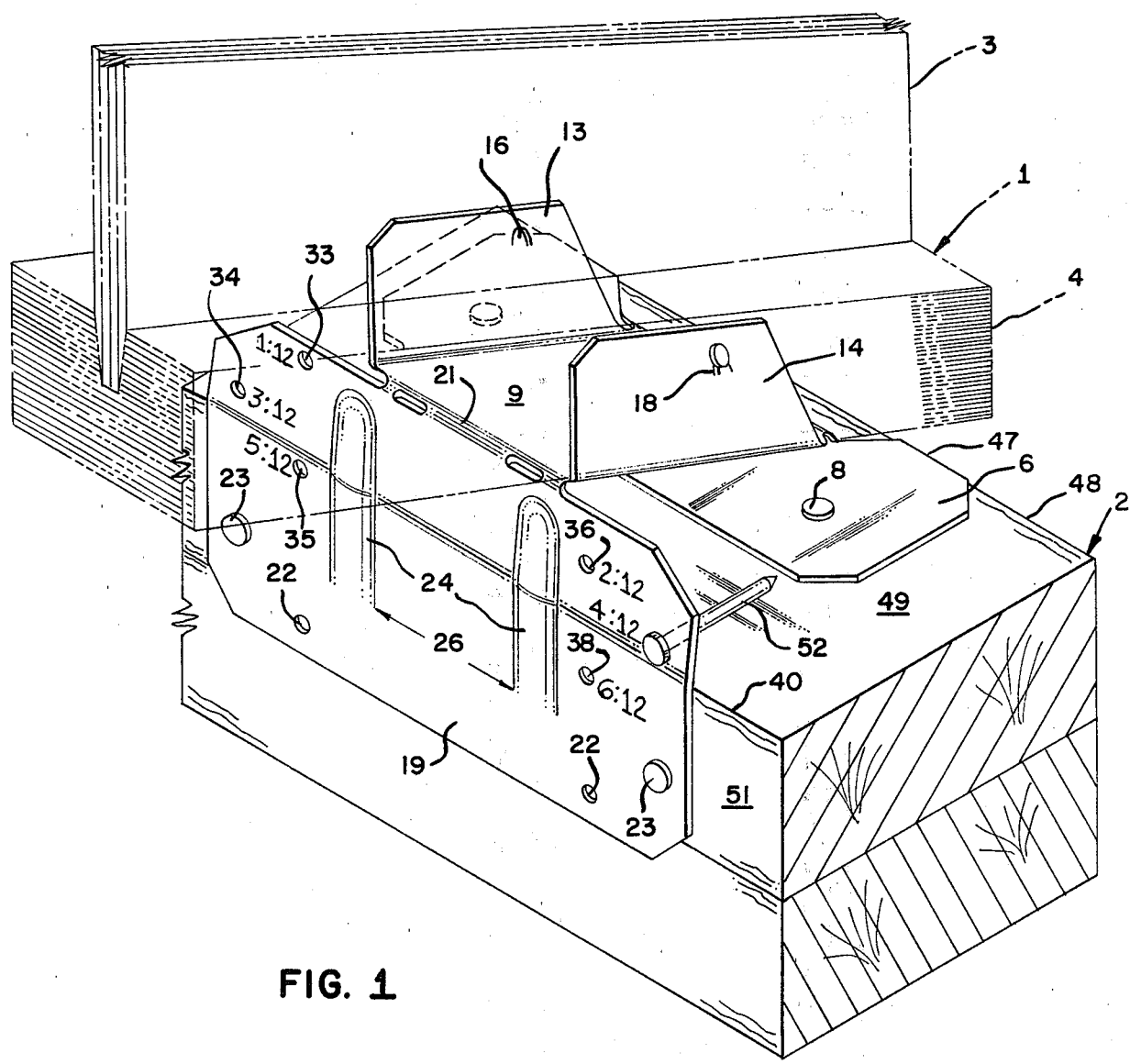
FIG. 1 is an isometric view of the preferred form of the invention connected to an "I" type Micro-Lam beam manufactured by Trus Joist of Boise, Idaho and to a double top plate.
Figure 3:
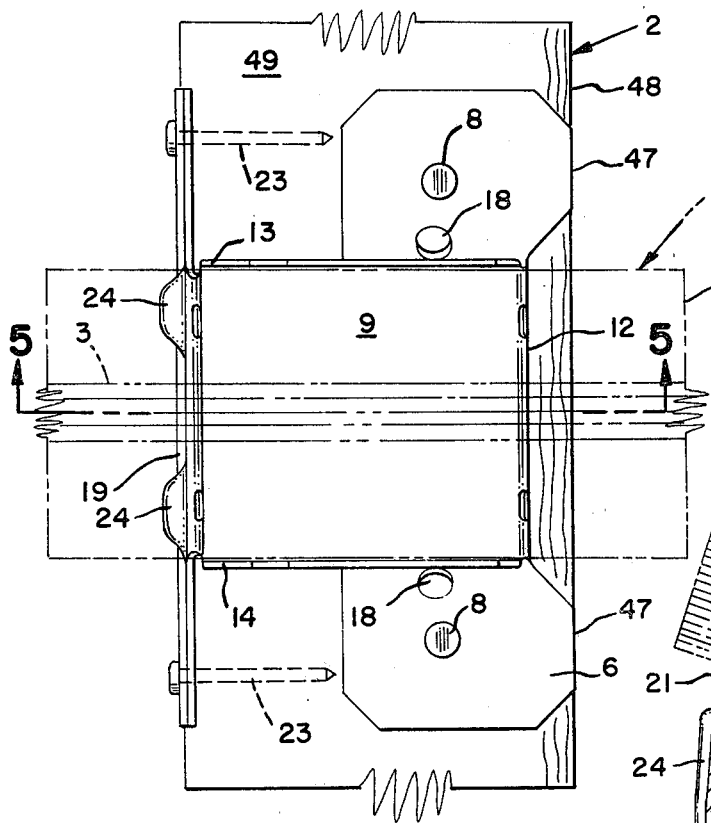
FIG. 3 is a top plan view of the connector shown in FIGS. 1 and 2.
Figure 5:
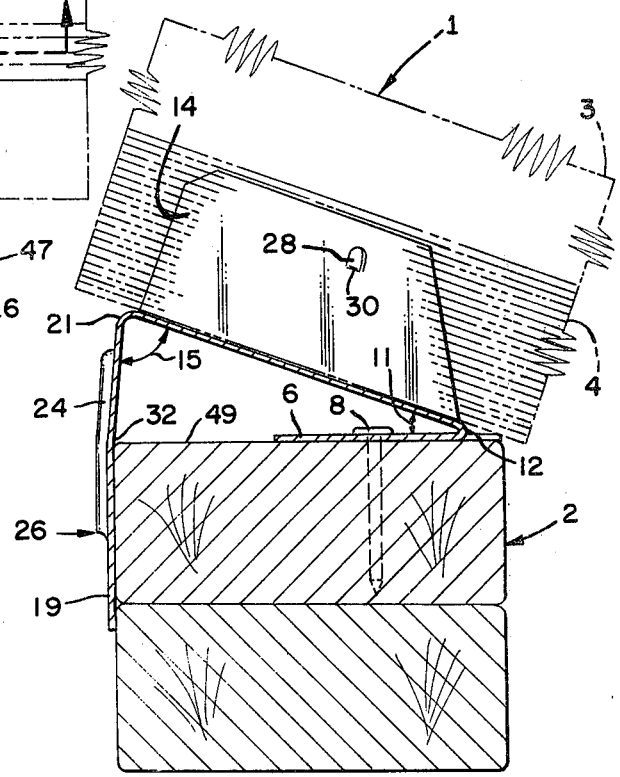
FIG. 5 is a cross sectional view taken along line 5—5 of FIG. 3.
Figure 2:
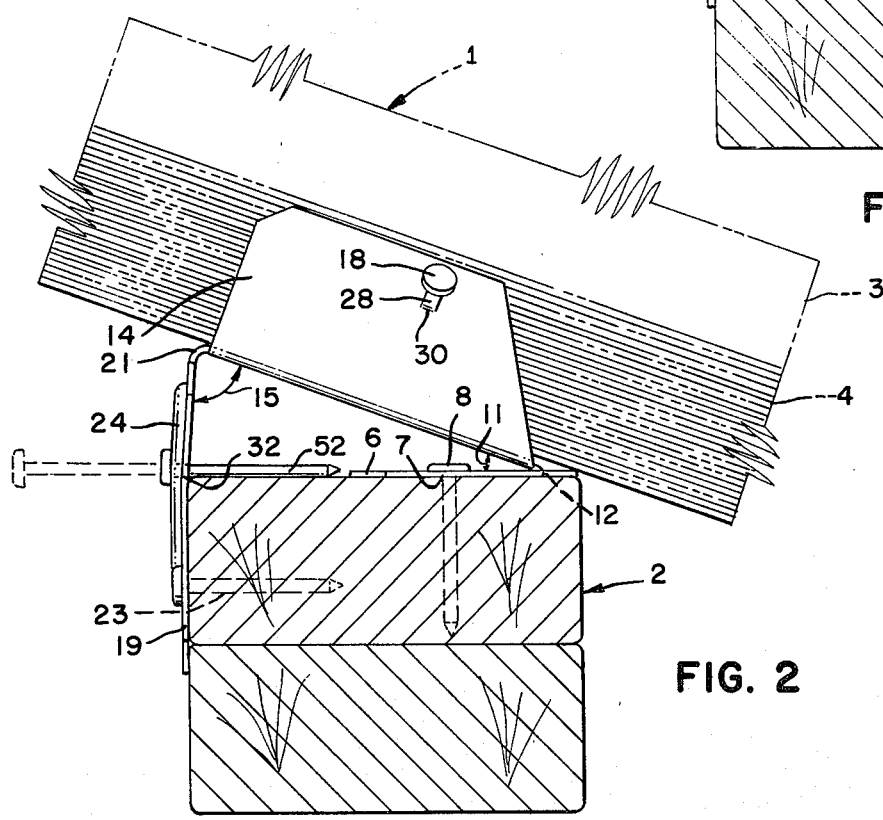
FIG. 2 is a side view of the connector shown in FIG. 1 with the top plate in cross section.

The variable pitch connector of the present invention is used for attaching an inclined beam member 1 to a bearing member 2. In the preferred form of the invention, the connector is attached to an "I" type Micro-Lam beam member manufactured by Trus Joist Corporation of Boise, Idaho which consists of thin ply members in a web section 3 and thin ply members arranged in planes at right angles to the web member in base chord 4. The bearing member or plate may consist of a pair of 2×4's or 2×6's placed on top of a wall or a ledger member attached to the upper face of a wall.

The connector may be formed from sheet metal having a gauge of 18 or 20 and have a base member 6 formed with fastener openings 7 adapted for receipt therethrough of fasteners 8 such as a nail for attachment to the bearing member 2. A seat member 9 is integrally attached at an acute angle 11 to the base member along a first bend line 12.

Side members 13 and 14 are integrally attached to the seat member and are formed with openings 16 and 17 for receipt therethrough of fasteners 18 such as nails for attachment to the side of the inclined member.

An upright member 19 is connected to the elevated end of the seat member along a second bend line 21 and is formed with openings 22 for receipt of fasteners such as nails 23 therethrough adapted to attachment to the bearing member.

The first and second bend lines 12 and 21 respectively are formed and dimensioned to permit field bending along the bend lines with common tools to permit modification of the connectors to hold the inclined beam members at a selected slope.

The upright member is preferably strengthened by some means such as upwardly extending embossments 24. The embossments may be tapered with the portion of deepest indentation at the end adjacent the bend line 21. The embossments are tapered and then terminate in the vicinity of arrow 26 to permit required field bending of the upright member as will be explained below.

Nails cannot be driven at right angles into the base chord 4 at the end of I-type Micro-Lam beams manufactured by Trus Joist Corporation. For this reason the side members 13 and 14 are each formed with a slot-like opening having a length greater than its width wherein the width is selected to register with the side of the nail fasteners. Tab-like members 27 and 28 are formed from the displaced face material from the slot-like openings and bent along bend lines 29 and 30 which constitute one end of the slot-like opening. The tab-like member is formed with a nail receiving surface for positively receiving a side of the nail in generally parallel, face-to-face relationship. The length of the slot-like opening is selected to receive the nail only at a pre-selected angle in relation to the face of the metal connector so that one side of the shank of the nail is in touching or close fitting relation to one end of the slot-like opening and the opposite side of the nail shank is in touching or close fitting relation to the nail receiving surface of the tab-like member. A complete description of the tab-like member is also set forth in the co-pending application Ser. No. 165,202 entitled Positive Nail Angling Device for Metal Connectors filed July 1, 1980 by Tyrell T. Gilb.

A feature of the present invention is the fact that the connector may be field bent to accommodate and hold rafters or beams at various selected pitches. In order to accomplish this, the base member 6 and the seat member 9 may be bent along first bend line 12 to form an acute angle 11 of between 135 degrees and 180 degrees as job required. An acute angle of about 150 degrees is an example commonly used in practice. The upright member 19 and the seat member are also adjustable with respect to one another and bending occurs along second bend line 21. This adjustment ranges from 90 degrees to approximtely an acute angle 15 to 120 degrees. A secondary transverse bend line 32 is selectively formed in upright member 19 corresponding generally with the top edge of the bearing member. Secondary bend line 32 could be preformed at the factory but generally occurs as the connector is being installed.

To assist the workmen in selecting the correct positioning of the connector for a selected rafter pitch, a plurality of nail receiving openings 33-38 are provided, one of which is selectively positioned in registration with the top face of the bearing member. A nail 52 is then temporarily placed through the opening for temporarily holding the connector at the proper elevation for a selected pitch of the seat member. For example, in FIGS. 4 and 6, the nail openings corresponding with particular pitches are as follows: Opening 33—1:12; opening 34—3;12; opening 35—5:12; opening 36—2:12; opening 37—4:12; and opening 38—6:12.

Still another method of assisting the workmen is to place indicia marks on the upright member corresponding to particular pitches. These marks transversely extend across a portion of the face and correspond with the top edge 40 of the bearing member as shown in FIG. 7. The indicia marks are each given the number 43 and are followed by the pitch of the beam to further identify them.

An alternate form of the invention is illustrated in FIG. 7. This form of the invention is primarily for use in connecting common rafters 42 to the plate members 2. The connector is identical to the connector shown in FIGS. 1-6 with the exception that the openings in the side members 13' and 14' are simply round openings 16' and 17' permitting nails 18 to be driven at right angles into the face of the rafter 42. All other parts are identical and given similar numbers where the parts are identical and are followed by the prime symbol(').

Figure 6:
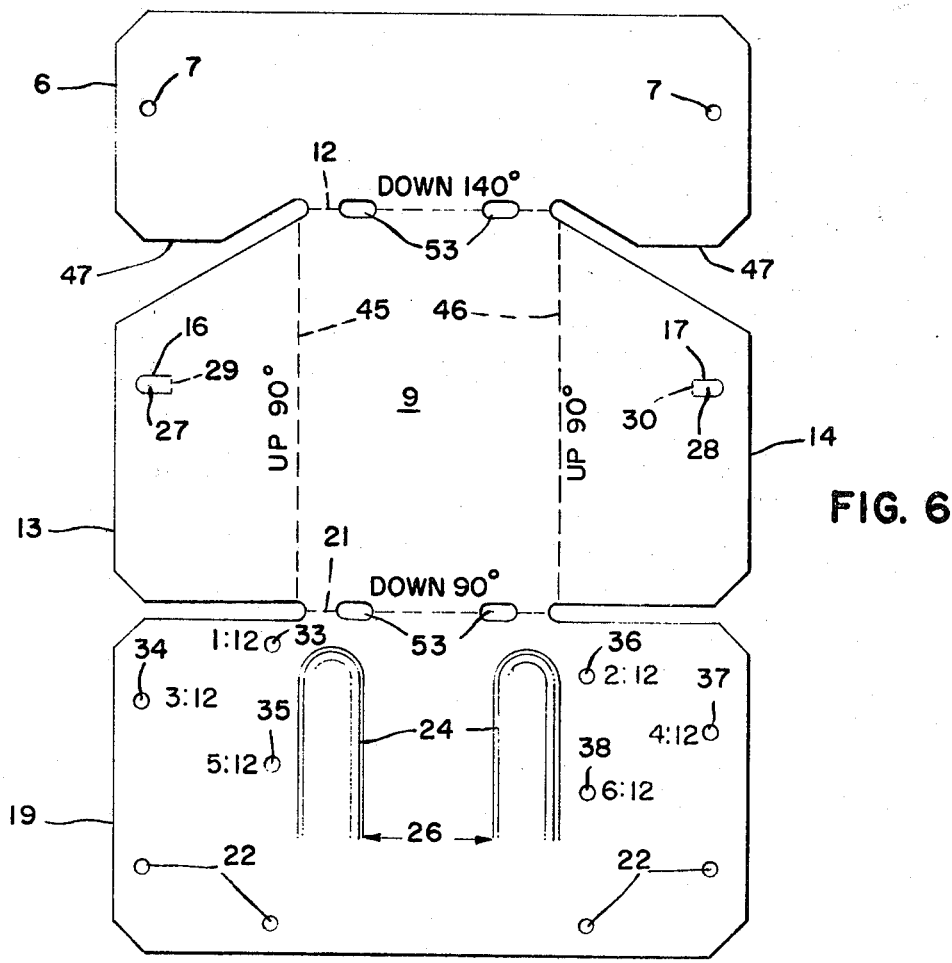
FIG. 6 is a plan view of the connector prior to bending.

The connectors of the present invention are produced on progressive die forming equipment and are cut to form blanks as shown in FIGS. 6 and 9. The connector is then bent at the factory to accomodate the most common rafter pitch or it may be custom bent as required by the customer. As an example, the base member is bent along line 12 downwardly 140 degrees and the upright member is bent downwardly 90 degrees along line 21. The side members 13 and 14 are bent upwardly 90 degrees along line 45 and 46. The bend line 32 in the upright member may be made at the factory if desired.

The workmen in the field first attach the base member 6 to the bearing member. The connector is preferably formed so that edge 47 of the base 6 is simply placed even with edge 48 of the bearing member 2. Nails 8 are then hammered through openings 7 in the base member into the top face 49 of bearing member 2. Setting of the pitch for the sloped beam member can be accomplished by different means. First, if the bend lines 12, 21 and 32 have been factory formed, the workman simply aligns edge 47 of the connector with edge 48 of the plate and bend line 32 with the top edge 40 of the bearing member and then hammers nails 23 through openings 22 in the upright member into side face 51 of the bearing member 2.

Figure 4:
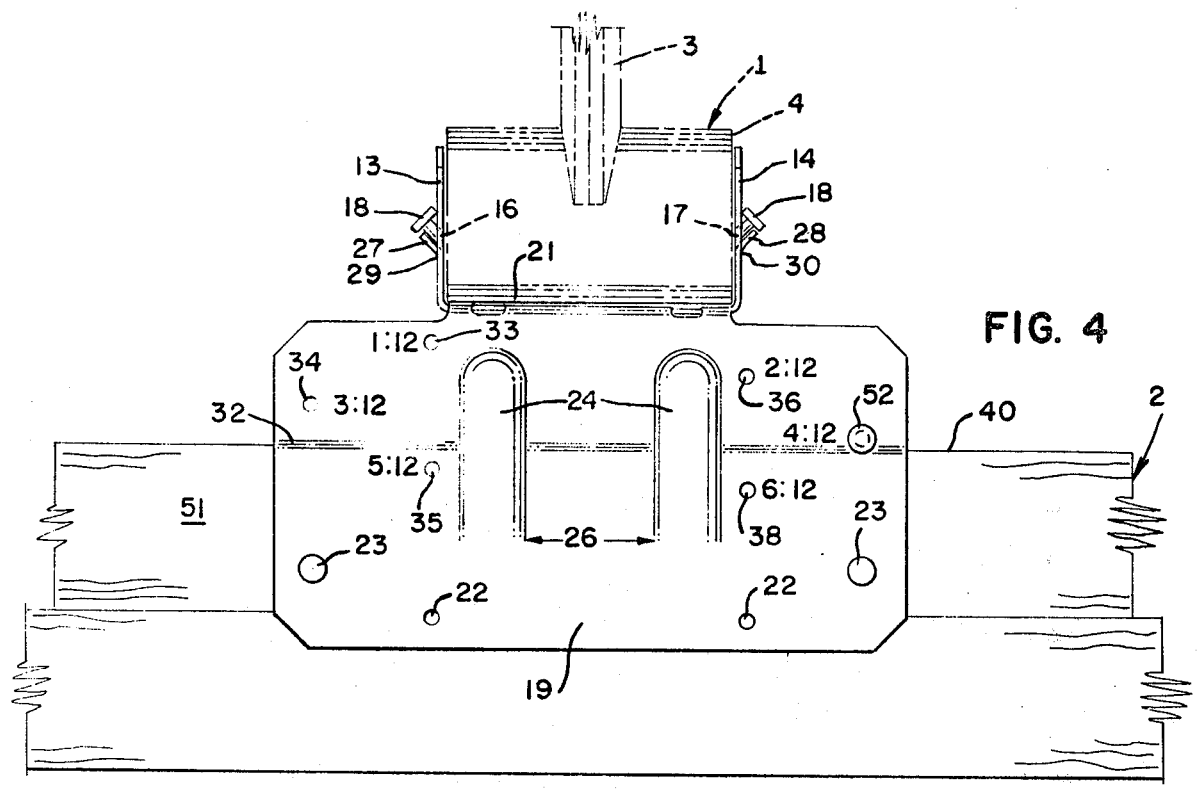
FIG. 4 is a front view of the connector illustrated in FIGS. 1-3.

If the bend line 32 is not formed at the factory and acute angles 11 and 15 are not preformed for the correct slope then the drawings illustrate two methods of selecting the correct bends in the connector to achieve the correct slope of the rafter or other held beam. If the connector illustrated in FIGS. 1-6 is used, the workman may attach the base as before and then place a nail 52 through any of the openings 33-38 which correspond with the selected pitch. As illustrated in FIGS. 1 and 4, the pitch of inclined member 1 is selected as 4:12. Therefore, the nail 52 is placed through opening 37 and rests on top face 49 of the bearing member. Nails 23 can then be hammered through openings 22 into the side face 51 of the bearing member 2. The bend line 32 will begin to form as a result of the installation and may be completed if necessary by hammering the upper portion of the upright member until it forms a flat face.

If the alternate form of the invention as set forth in FIG. 7-9 is used, the connector may be attached in the manner set forth above, except that the nailing of the upright member is completed after the selected indicia mark 43 is aligned with the top edge 40 of the bearing member.

After the connector is attached, the sloping beam member 1 is placed on the seat member 9 and nails 18 are driven into openings 16 in the side of the member. For the sloping member set forth in FIGS. 1-6, nails 18 are driven at an angle as shown, whereas the nails are driven at a right angle in the form shown in FIGS. 7-9.

Finally, another method of attaching the connector is to first attach the base of the connector to the bearing member, then place nail 52 through the selected opening 33-38. The rafter is then nailed to the ridge pole and to the side member of the connector. Nails 23 are then driven through openings 22 of the upright member.

It is to be understood that nails may also be driven through openings 33-38 to complete the attachment of the upright member to the bearing member.

The product line to produce the connectors, as an example, may consist of two basic and relatively inexpensive type progressive dies to provide the 3½"'bearing type and the 5½" bearing type. Within each type, a very simple method may provide 6 sub-models. A combination of variable width inserts in the die with a variable coil width provides the six different models. The weight of the product averages approximately one half pound for the 3½" series and approximately three-quarters of a pound for the 5½" series.

The uniqueness of the connector lies in the ability of a single device to be formed in the field to accommodate an infinite number of rafter slope settings within the parameters of standard building construction. The key is the ability to bend the device along bend lines 12 and 21 to achieve the required angles between the base member and the seat member and between the seat member and the upright member. For ease in bending openings 53 along the bend lines may be formed in the connector.

We claim:

1. A variable pitch connector for attaching an inclined beam member to a bearing member comprising:
    a. a nailable generally horizontal bearing member having a top face and laterally disposed first and second side faces;
    b. an inclined nailable beam member positioned above said bearing member for support thereby;
    c. a sheet metal connector joining said bearing member and said inclined beam member at selected pitches;
        (1) said connector includes a base member having laterally disposed in-line edges for registration with the edge of said first side face of said bearing member and an inset edge therebetween and formed with fastener openings for attchment to said bearing member;
        (2) said connector includes a seat member integrally attached at a selected acute angle to said base member along a first bend line which is coincident with said inset edge and is formed with a longitudinally spaced elevated end and is dimensioned for holding a portion of said base of said inclined beam member;
        (3) said connector includes laterally spaced side members integrally attached to said seat member and formed with openings for attachment to the sides of said inclined member;
        (4) said connector includes an upright member connected to said elevated end of said seat member along a second bend line which is coincident with said elevated end of said seat member and is formed with openings for attachment of said upright member to said second side face of said bearing member; and
    d. said beam member is positioned so that a portion rests upon said top face of said bearing member adjacent said edge of first side face.

2. A connector as described in claim 1 wherein:
    a. said first and second bend lines in said metal connector are formed and dimensioned to permit field bending along said bend lines with common tools to permit modification of said connectors to hold said inclined beam members at a selected slope.

3. A connector as described in claim 1 wherein:
    a. said upright member is formed with upwardly extending embossments.

4. A variable pitch connector for attaching an inclined beam member to a bearing member comprising:
    a. a base member formed with fastener openings and adapted for attachment to a bearing member;
    b. a seat member integrally attached at an acute angle to said base member along a first bend line;
    c. side members integrally attached to said seat member and formed with openings adapted for attachment to the side of said inclined member;
    d. an upright member connected to the elevated end of said seat member along a second bend line and formed with openings adapted for attachment to said bearing member;
    e. said side members are each formed with a slot-like opening having a length greater than its width wherein said width is selected to register with the sides of nail fasteners adapted for receipt therein;
    f. a tab-like member formed from the displaced face material from said slot-like opening and bent along a bend line which constitutes one end of said slot-like opening;
    g. said tab-like member is formed with a nail receiving surface for positively receiving a side of said nail in generally parallel, face-to-face relationship;
    h. the length of said slot-like opening is selected to receive said nail only at a pre-selected angle in relation to the face of said metal connector so that one side of the shank of said nail is in touching or close fitting relation to one end of said slot-like opening and the opposite side of said nail shank is in touching or close fitting relation to said nail receiving surface of said tab-like member;
    1. said first and second bend lines in said metal connector are formed and dimensioned to permit field bending along said bend lines with common tools to permit modification of said connectors to hold said inclined beam members at a selected slope; and
    j. said upright member is formed with upwardly extending embossments.

5. A connector as described in claim 4, comprising:
    a. said upright member is selectively formed with a secondary transverse bend line corresponding generally with and adapted for approximate registration with the top edge of said bearing member.

6. A connector as described in claim 4 comprising:

a. said upright member is formed with a plurality of nail receiving openings selectively positioned and adapted for registration with the top face of said bearing member for temporarily holding said connector at the proper elevation for a selected pitch of said seat member.

7. A connector as described in claim 4 comprising:
a. said upright member is formed with a plurality of transversely extending indicia marks corresponding with selected pitches for said seat member and are adapted for registration with the top edge of said bearing member.

* * * * *

UNITED STATES PATENT AND TRADEMARK OFFICE
CERTIFICATE OF CORRECTION

PATENT NO. : 4,410,294
DATED : October 18, 1983
INVENTOR(S) : Tyrell T. Gilb and Alfred D. Commins It is certified that error appears in the above–identified patent and that said Letters Patent are hereby corrected as shown below:

In Column 2, line 14, change "conductor" to --- connector ---

In Column 3, line 11, change "to attachment" to --- for attachment ---

In Column 3, line 60, change "15 to 120 degress" to --- 15 of 120 degrees ---

*Signed and Sealed this*

*Sixth* Day of *December 1983*

[SEAL]

Attest:

GERALD J. MOSSINGHOFF

Attesting Officer   Commissioner of Patents and Trademarks